(12) United States Patent
Yamamoto et al.

(10) Patent No.: US 11,164,217 B2
(45) Date of Patent: Nov. 2, 2021

(54) DRIVING SUPPORT SYSTEM

(71) Applicant: AICHI STEEL CORPORATION, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 0 days.

(21) Appl. No.: 16/960,918

(22) PCT Filed: Jan. 11, 2019

(86) PCT No.: PCT/JP2019/000718
§ 371 (c)(1),
(2) Date: Jul. 9, 2020

(87) PCT Pub. No.: WO2019/142740
PCT Pub. Date: Jul. 25, 2019

(65) Prior Publication Data
US 2020/0357027 A1 Nov. 12, 2020

(30) Foreign Application Priority Data
Jan. 16, 2018 (JP) .............................. JP2018-004794

(51) Int. Cl.
*G06Q 30/02* (2012.01)
*H04W 4/02* (2018.01)
(Continued)

(52) U.S. Cl.
CPC ....... *G06Q 30/0273* (2013.01); *G06Q 20/102* (2013.01); *G06Q 30/0266* (2013.01);
(Continued)

(58) Field of Classification Search
CPC ........... G06Q 10/063118; G08G 1/042; G01C 21/20; G09B 9/042
See application file for complete search history.

(56) References Cited

U.S. PATENT DOCUMENTS

2002/0065600 A1* 5/2002 Oka ....................... G08G 1/042
701/516
2010/0121703 A1 5/2010 Goto
(Continued)

FOREIGN PATENT DOCUMENTS

JP 2002-333322 A 11/2002
JP 2013-102310 A 5/2013
(Continued)

OTHER PUBLICATIONS

International Search Report for corresponding Application No. PCT/JP2019/000718, dated Apr. 2, 2019.
(Continued)

*Primary Examiner* — Saba Dagnew
(74) *Attorney, Agent, or Firm* — Renner, Otto, Boisselle & Sklar, LLP

(57) ABSTRACT

A driving support system capable of collecting usage fees from a user using the system, and including an information acquiring part which acquires, from a vehicle side capable of acquiring marker identification information for identifying a detected magnetic marker, upload information including the marker identification information, a marker database having marker position data recorded therein as being linked to the marker identification information, an information providing part which provides the vehicle side with support information including the marker position data, a usage fee totalizing part which totalizes the usage fees to be charged to the vehicle side in accordance with a history of providing the support information, and a payment request part which transmits a withdrawal request to external server of a financial institution which manages an account from which the usage fees are withdrawn.

20 Claims, 23 Drawing Sheets

(51) Int. Cl.
*H04W 4/40* (2018.01)
*G06Q 20/10* (2012.01)
*G07C 5/00* (2006.01)
*G08G 1/04* (2006.01)
*H04W 4/029* (2018.01)
*G08G 1/042* (2006.01)

(52) U.S. Cl.
CPC ............ *G07C 5/008* (2013.01); *G08G 1/042* (2013.01); *H04W 4/029* (2018.02); *H04W 4/40* (2018.02)

(56) References Cited

U.S. PATENT DOCUMENTS

| | | | |
|---|---|---|---|
| 2012/0199648 A1* | 8/2012 | Hanson | G01C 21/20 235/375 |
| 2013/0302756 A1* | 11/2013 | Takeuchi | G09B 9/042 434/64 |
| 2014/0308897 A1 | 10/2014 | Toya | |
| 2016/0054140 A1 | 2/2016 | Breed | |
| 2016/0086128 A1* | 3/2016 | Geiger | G06Q 10/063118 705/7.17 |
| 2019/0098468 A1 | 3/2019 | Yamamoto | |

FOREIGN PATENT DOCUMENTS

| | | |
|---|---|---|
| JP | 2015-201107 A | 11/2015 |
| JP | 2017-199247 A | 11/2017 |
| WO | 2008/139889 A1 | 11/2008 |
| WO | 2017/187881 A1 | 11/2017 |

OTHER PUBLICATIONS

Extended European Search Report corresponding application No. 19741870.0 dated Sep. 3, 2021.

* cited by examiner

[FIG. 1]
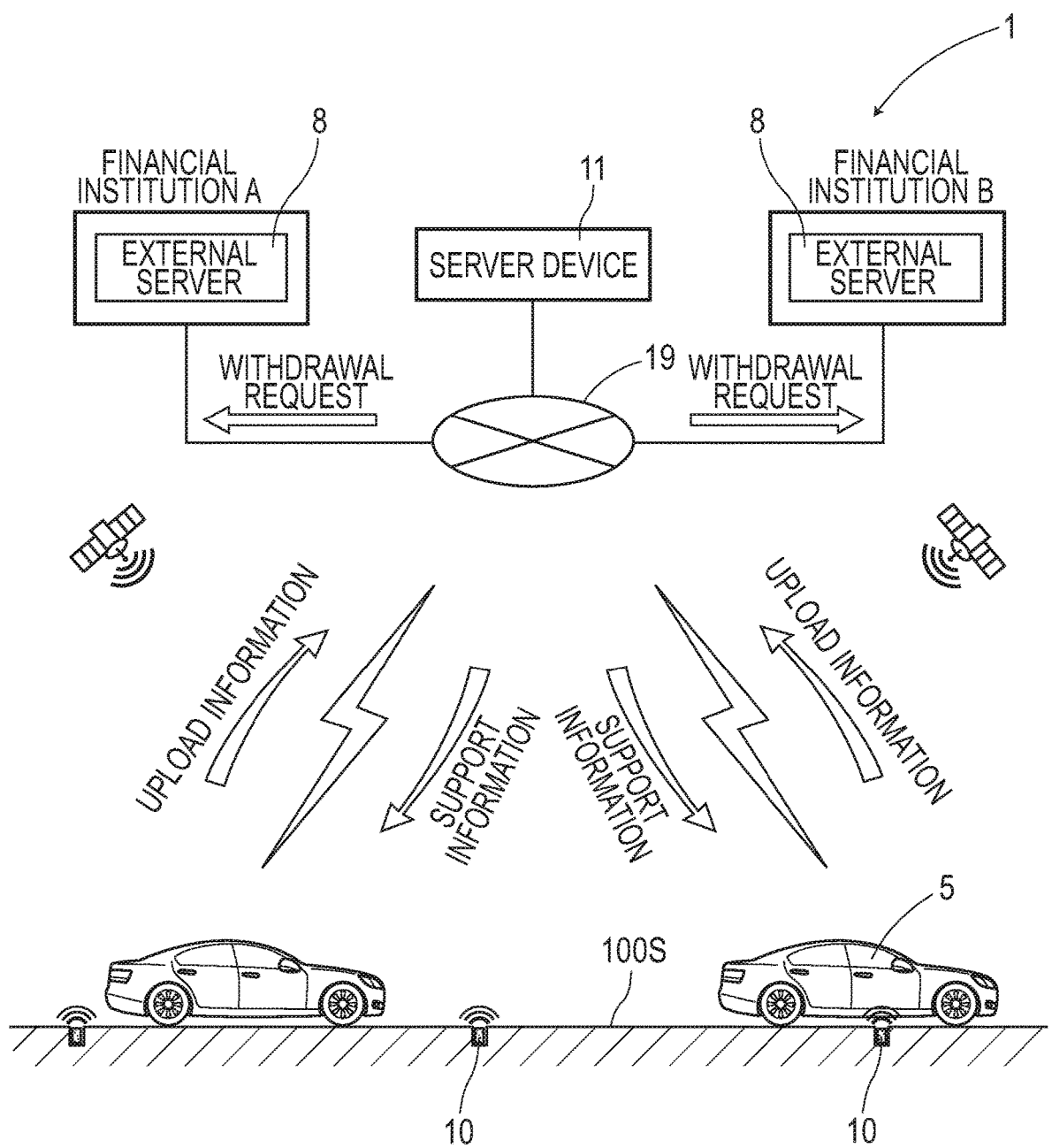

[FIG. 2]
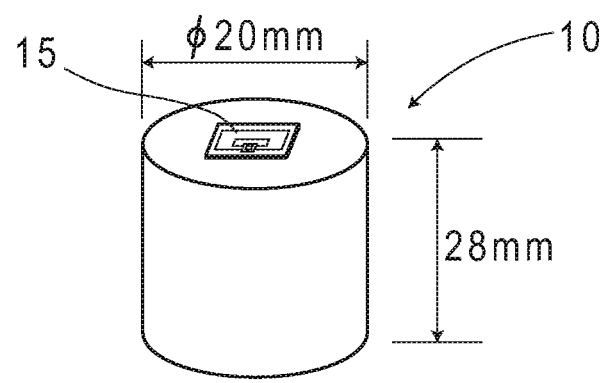

[FIG. 3]
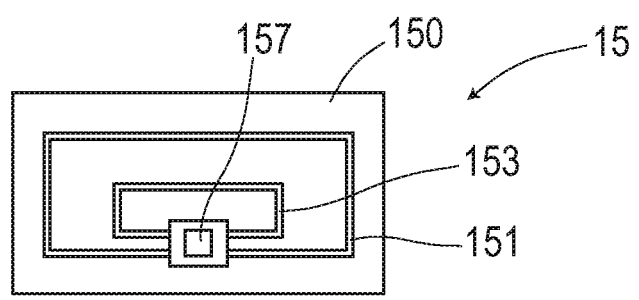

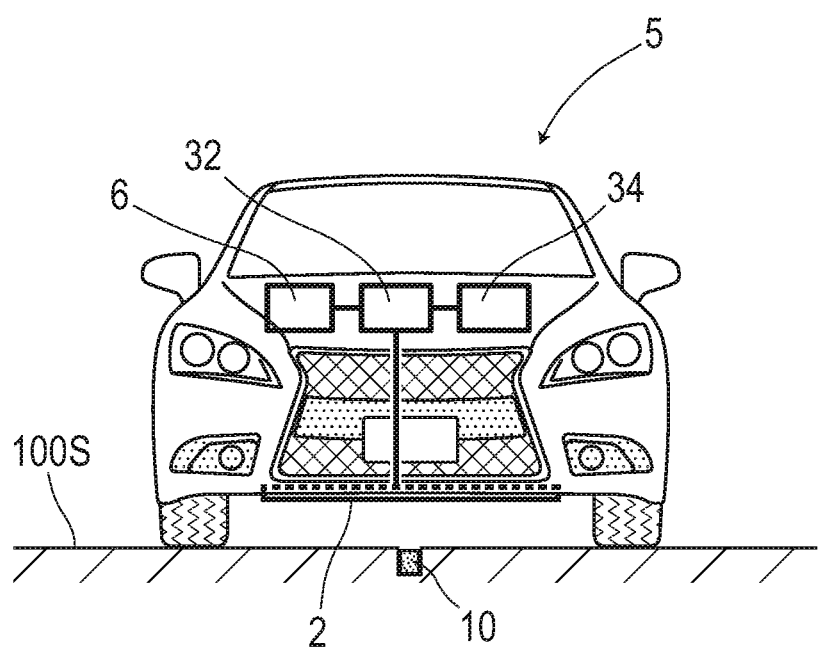
[FIG. 4]

[FIG. 5]
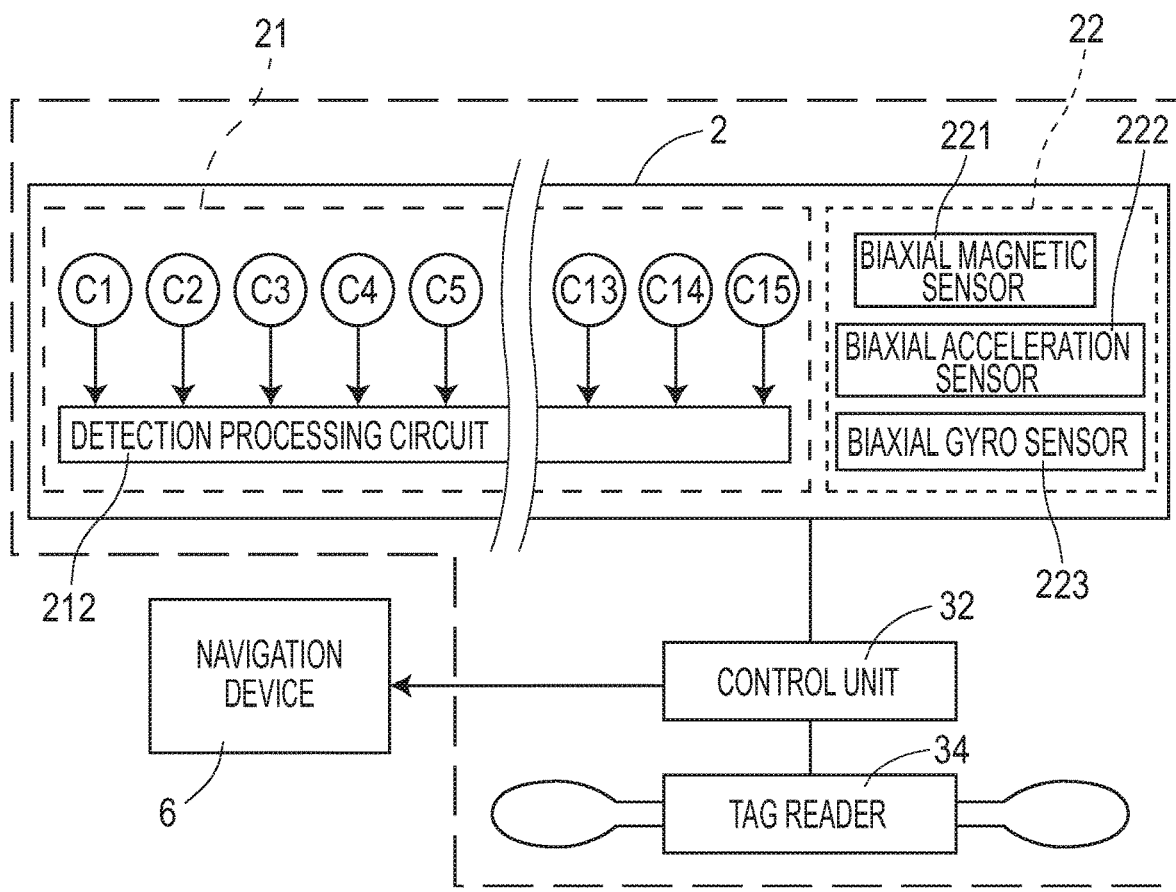

[FIG. 6]
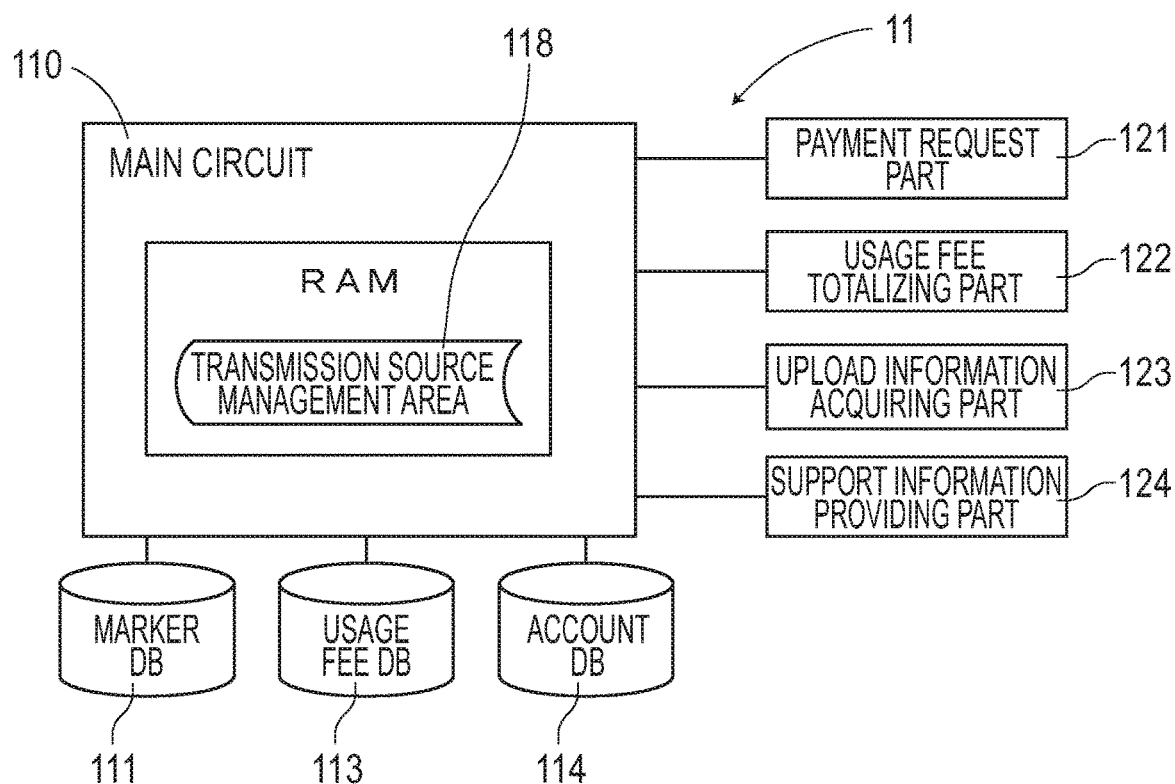

[FIG. 7]
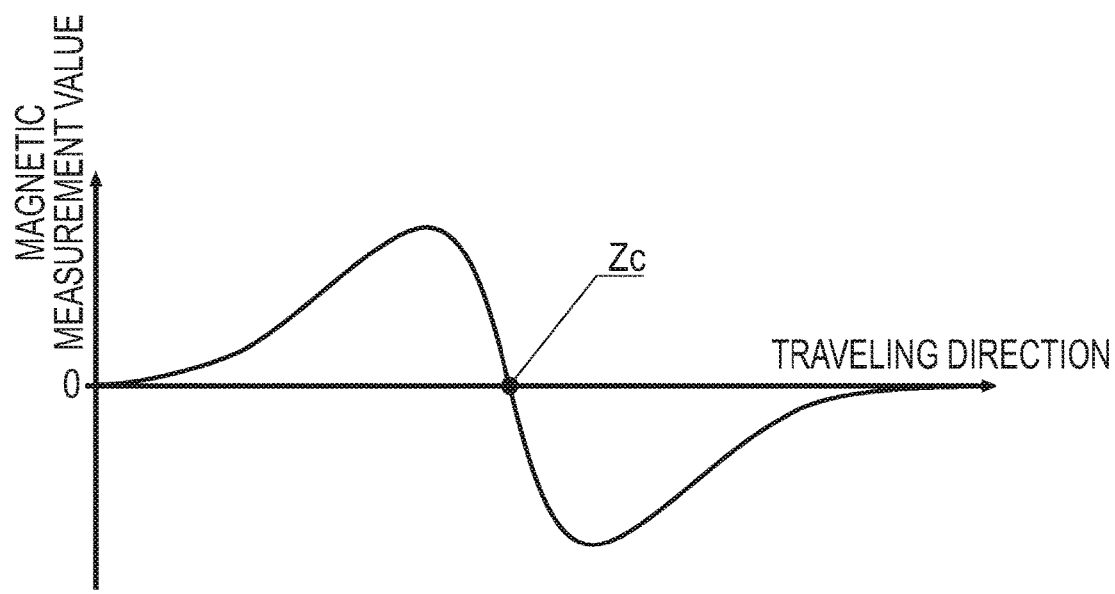

[FIG. 8]
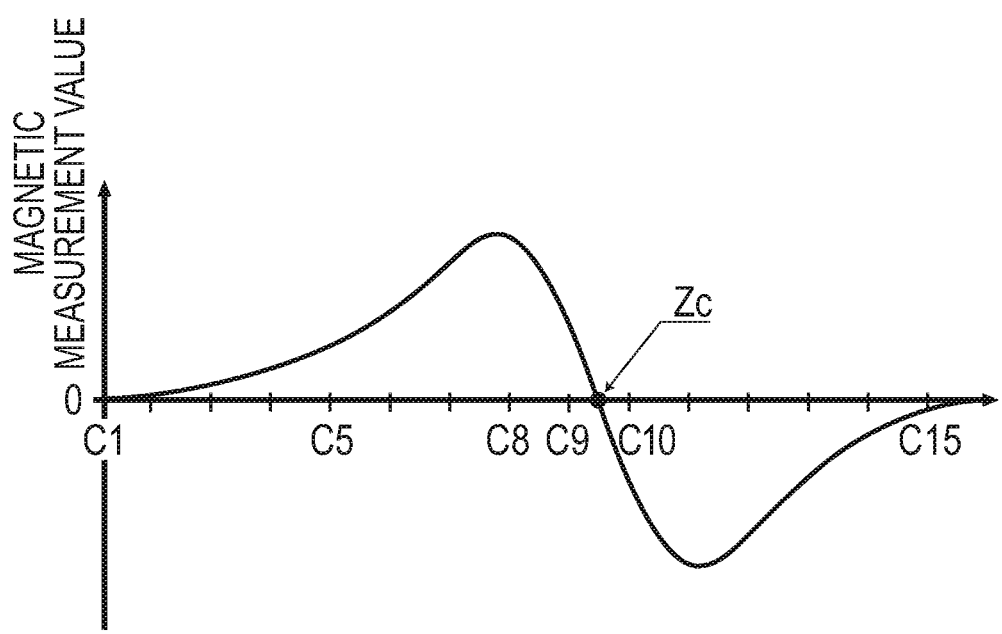

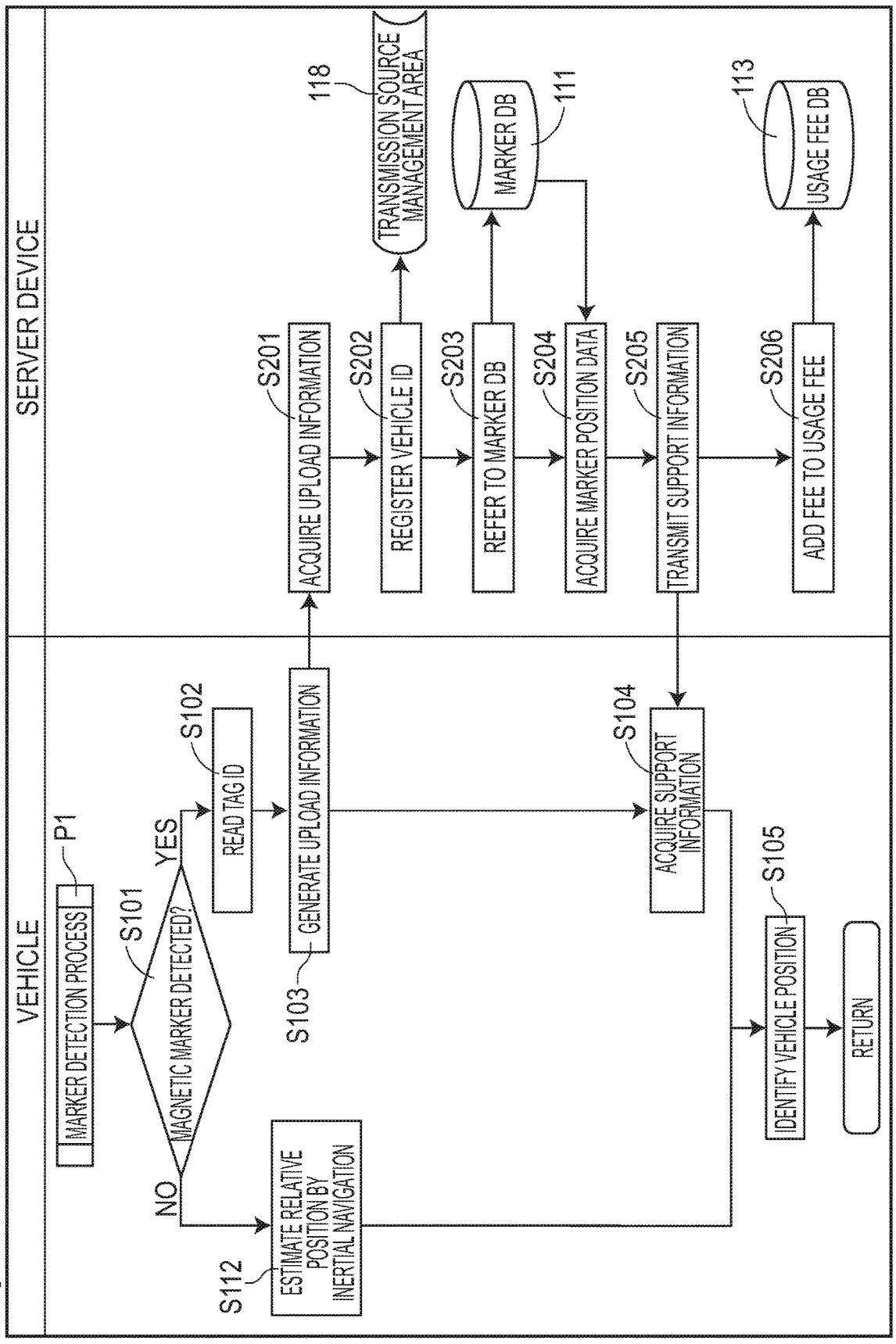
[FIG. 9]

[FIG. 10]
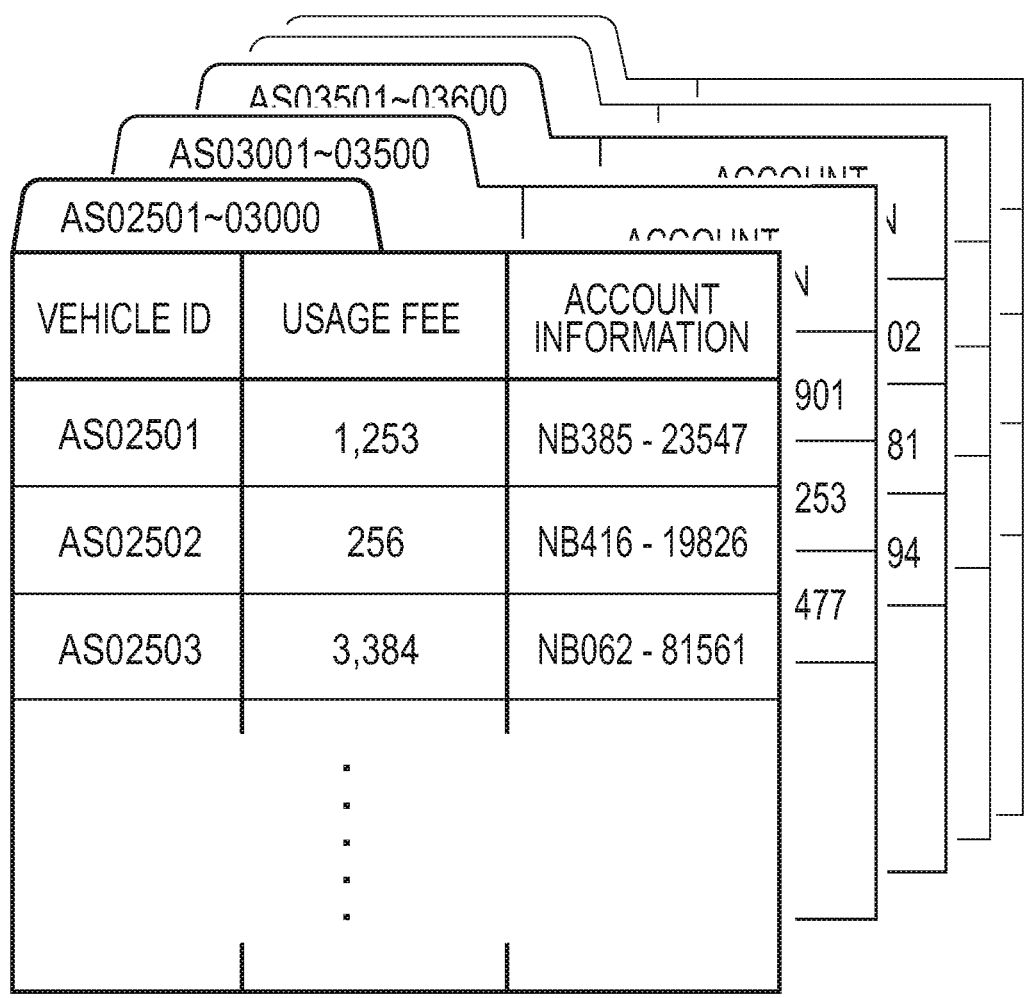

[FIG. 11]
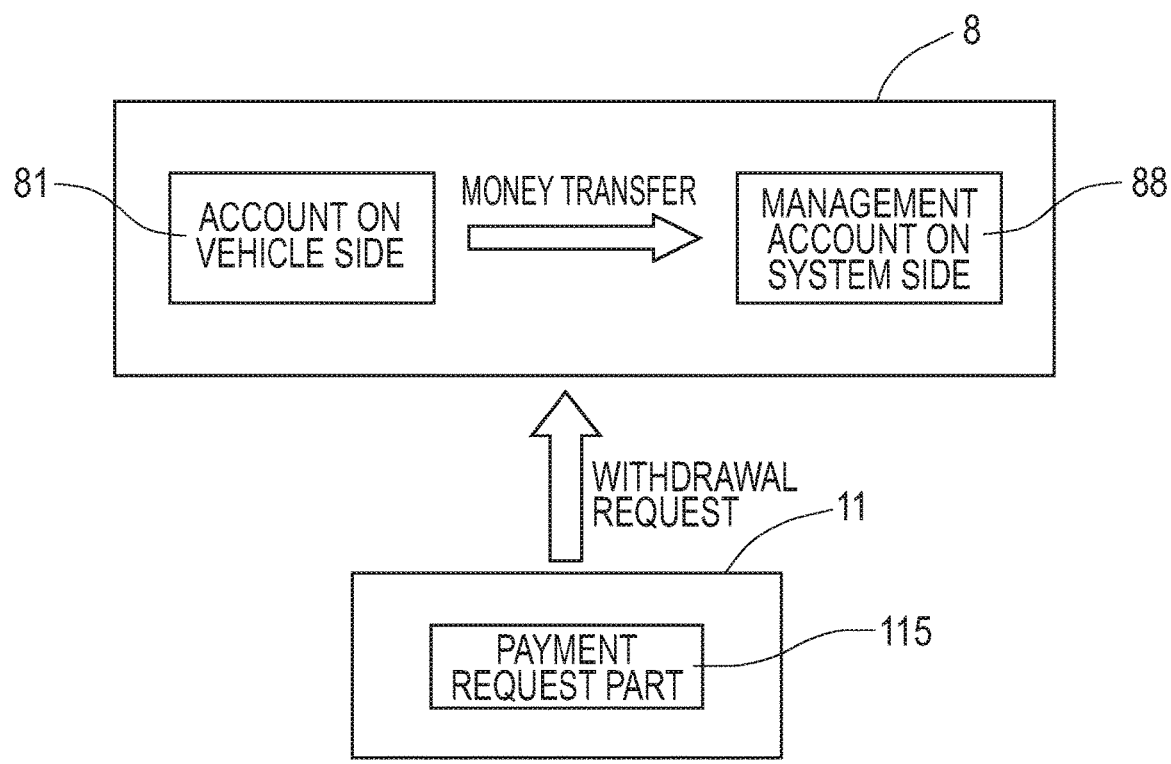

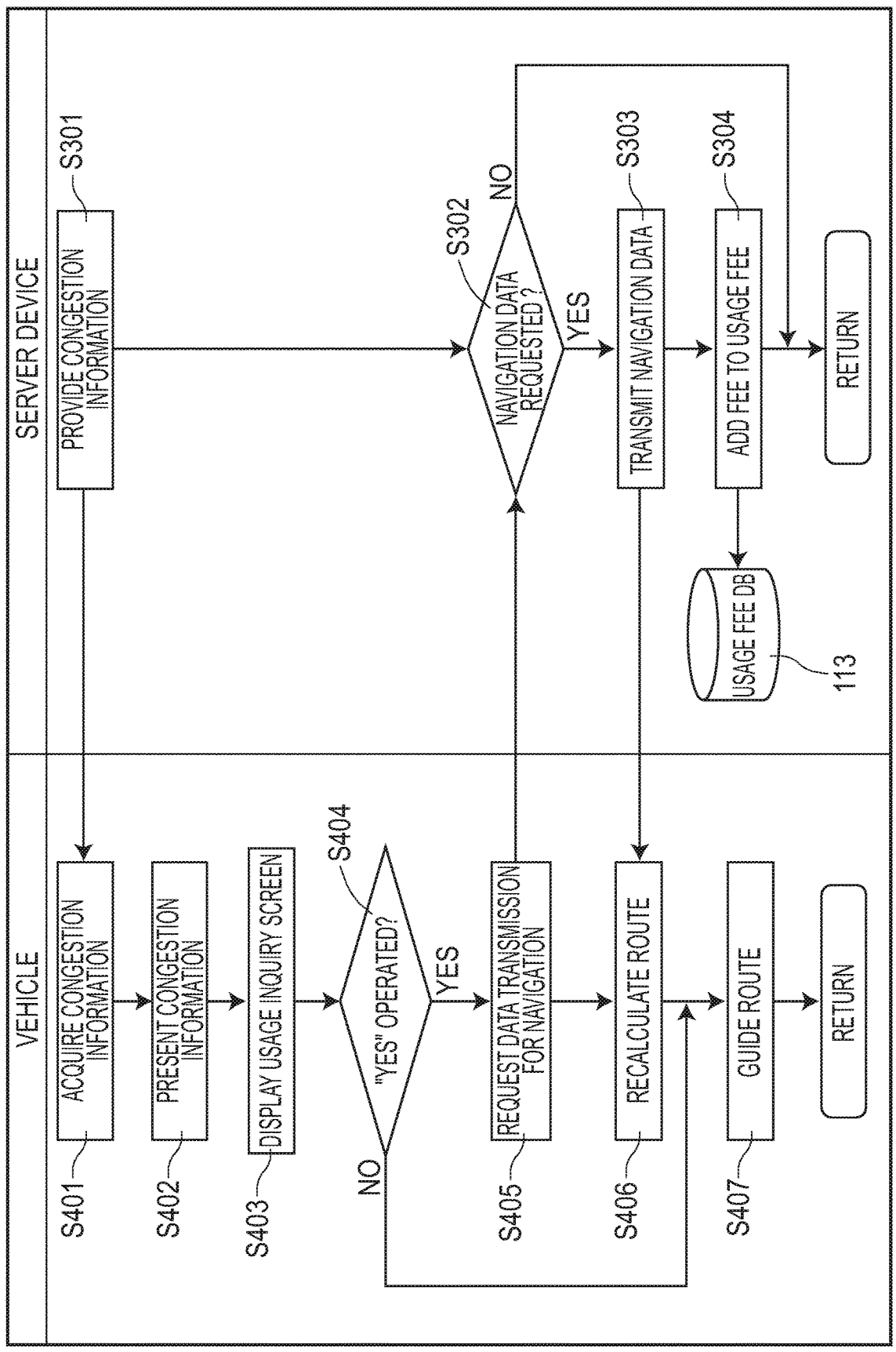
[FIG. 12]

[FIG. 13]
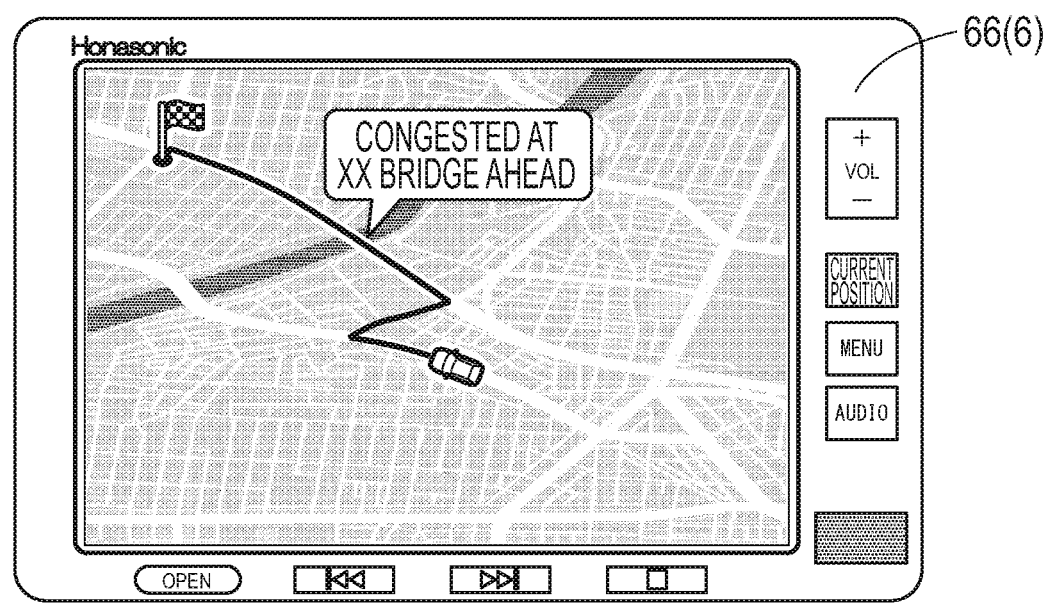

[FIG. 14]
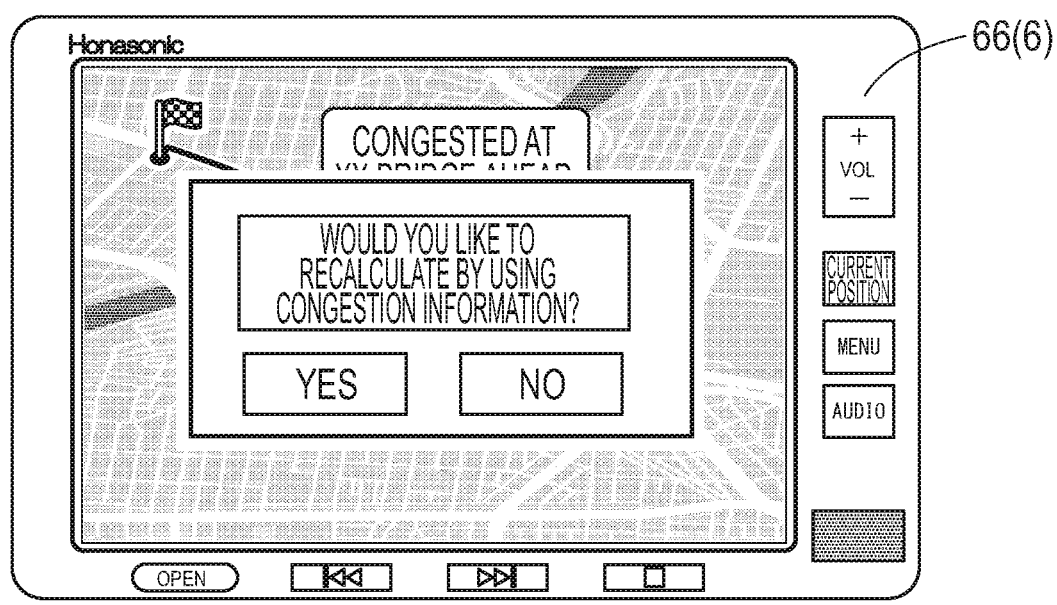

[FIG. 15]
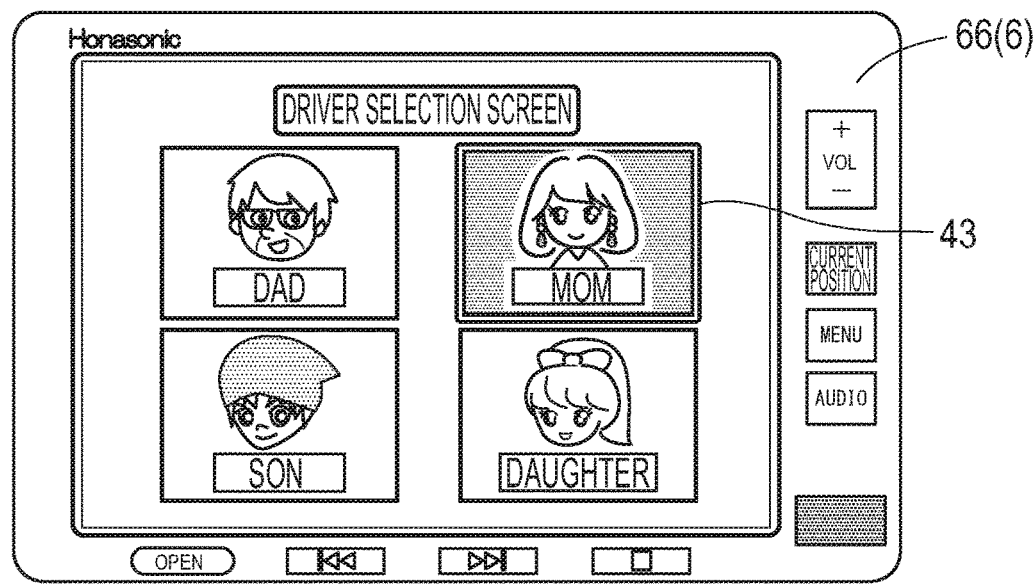

[FIG. 16]
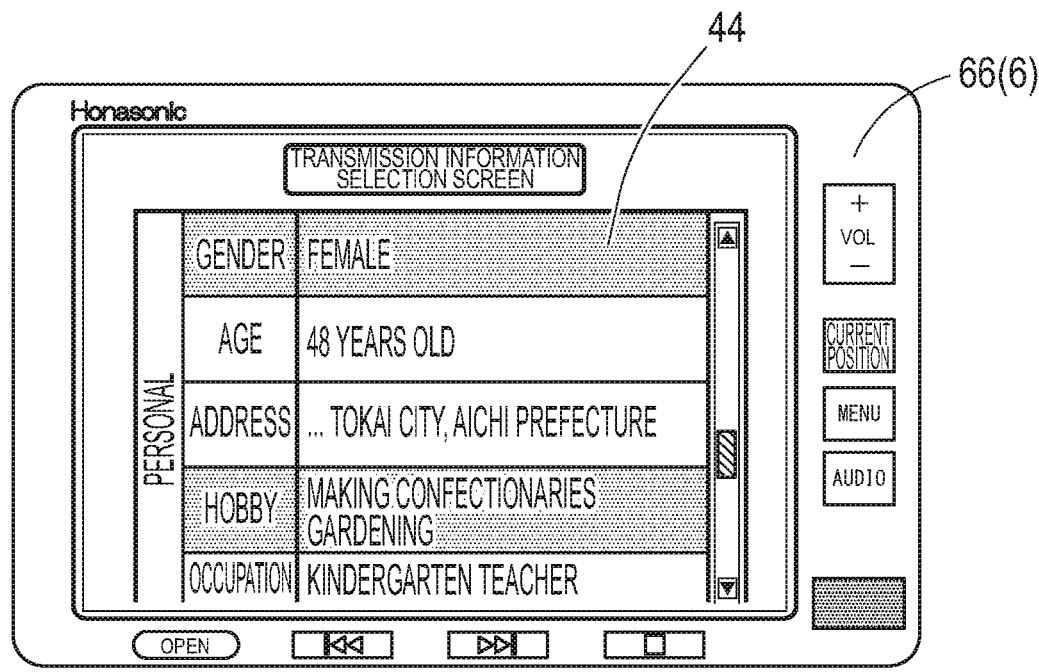

[FIG. 17]
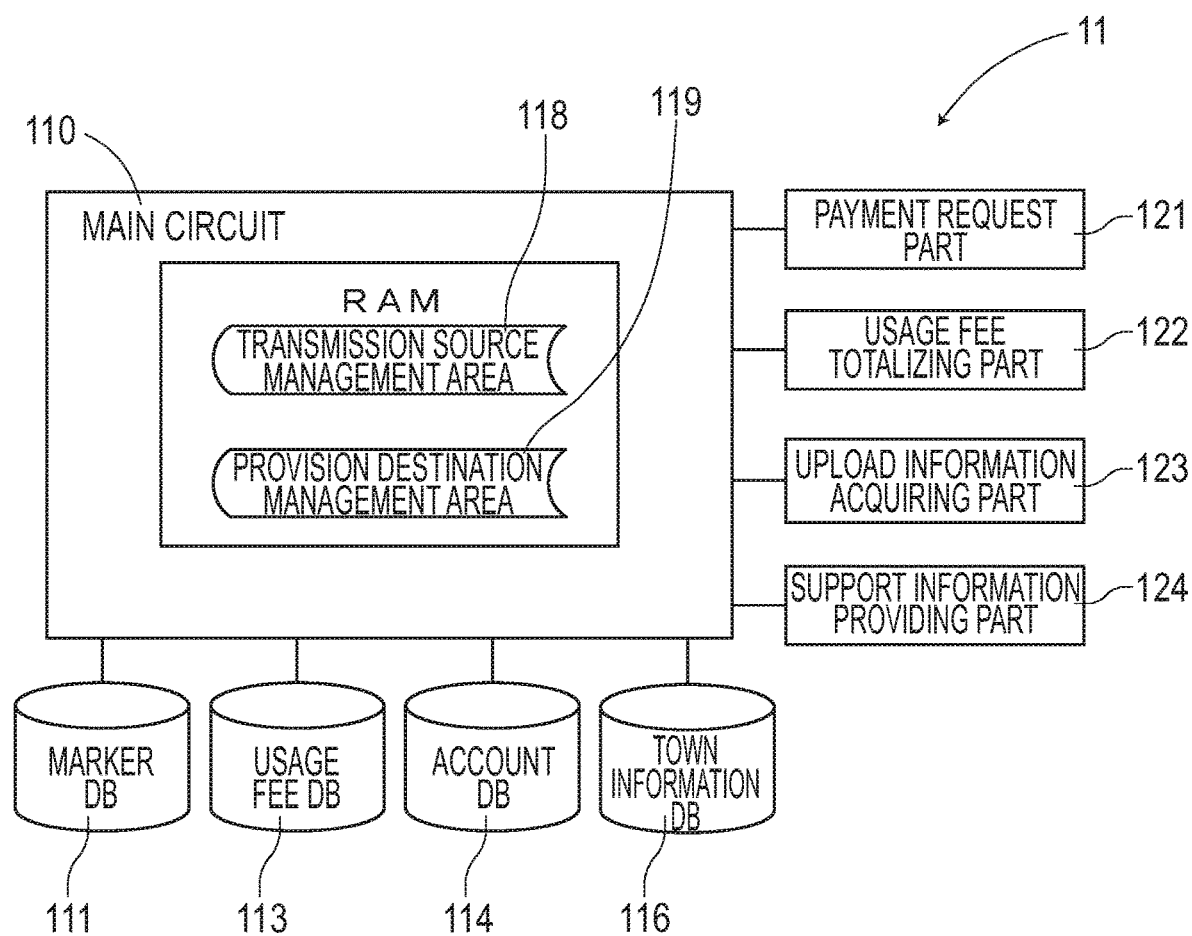

[FIG. 18]

AREA A5

| BUSINESS ENTITY ID | NAME | LOCATION (LATITUDE/ LONGITUDE) | BUSINESS TYPE | PROVISION TYPE | TARGET GROUP | COMMENT | ADDRESS AND TELEPHONE NO. |
|---|---|---|---|---|---|---|---|
| abababab | Cafe☆Star | 35.385756/ 137.557200 | COFFEE SHOP CAFE | 1 | F1 (FEMALES AGED 20 TO 34 YEARS) | SPONGY PANCAKES EQUIPPED WITH SOFAS, CHILDREN ARE WELCOME COUPON AVAILABLE | 1-1, TOKAI CITY, AICHI PREFECTURE 052-000-0000 |
| cdcdcdcd | flower MAI | 36.126651/ 139.126289 | FLOWER SHOP | 2 | F2 (FEMALES AGED 35 TO 49 YEARS) | SMALL FLORIST IN TOWN ARRANGE FLOWERS ACCORDING TO YOUR BUDGET LOCAL DELIVERY AVAILABLE | 1-2, TOKAI CITY, AICHI PREFECTURE 052-000-1111 |
| ghghghgh | BAIKADO | 35.510127/ 138.172601 | TEA SHOP SWEETS | 1 | F2 (FEMALES AGED 35 TO 49 YEARS) | ESTABLISHED IN 1897 ENJOY OUR SEASONAL JAPANESE-STYLE CONFECTIONARY TEA CORNER AVAILABLE | 2-1, TOKAI CITY, AICHI PREFECTURE 052-000-2222 |
| opopopop | FITNESS STUDIO WILL | 37.200124/ 136.652301 | SPORTS | 1 | M2 (MALES AGED 35 TO 49 YEARS) | FITNESS & BOXING GYM AVAILABLE EARLY IN MORNING AND LATE AT NIGHT EQUIPPED WITH PARKING LOT FREE TRIAL AVAILABLE! | 2-2, TOKAI CITY, AICHI PREFECTURE 052-000-3333 |

[FIG. 19]
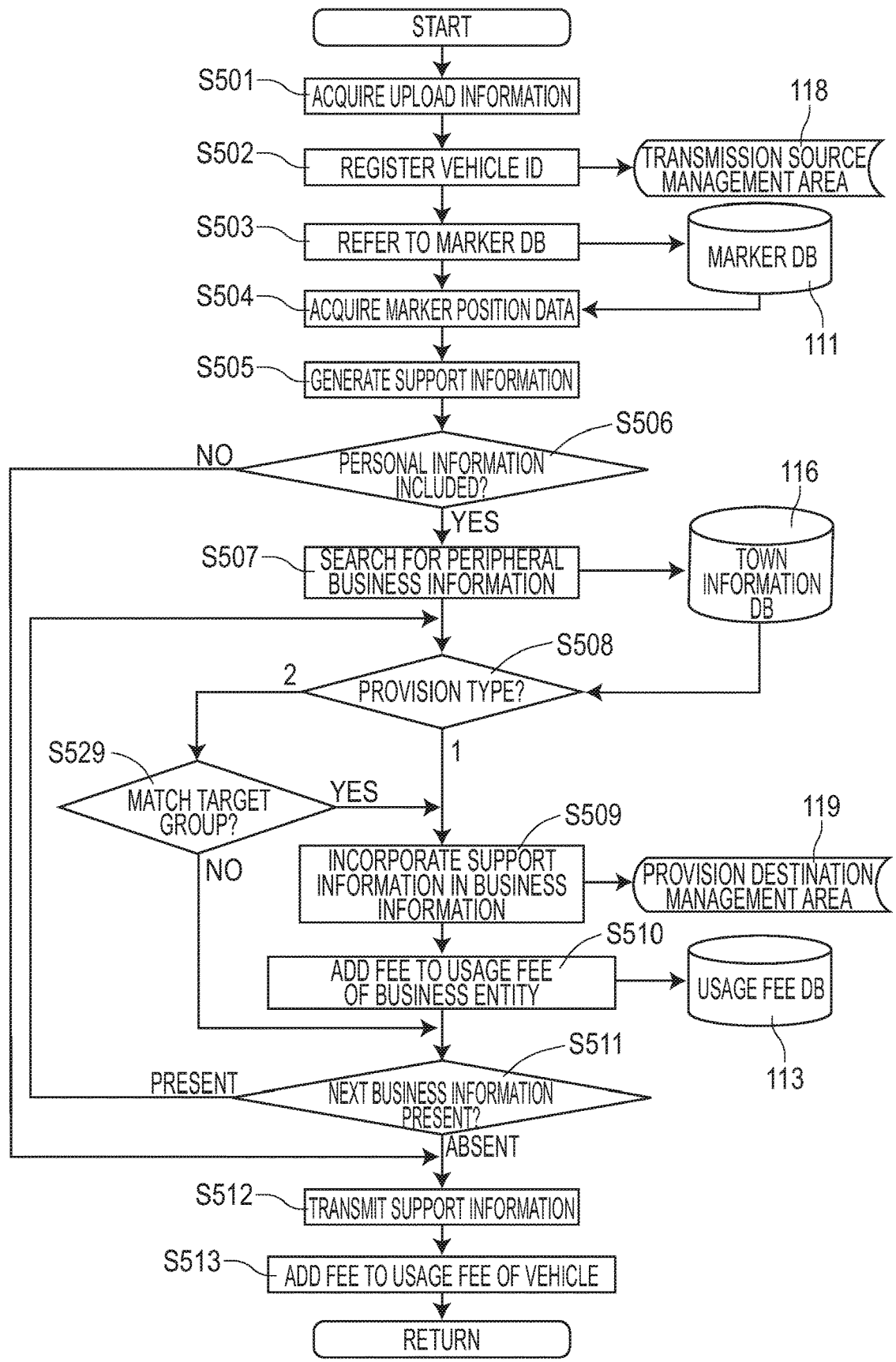

[FIG. 20]

| BUSINESS ENTITY ID | PROVISION DESTINATION VEHICLE ID | | |
|---|---|---|---|
| ackekgjely | AS01013　AS01236　AS01501　AS02263　⋮　AS05327　AS05820 | AS01067　AS01278　AS01572　AS02276　⋮　AS05420　AS05834 | AS01180　AS01299　AS01783　AS02281　⋮　AS05783　AS05960 |
| kgusymhp | AS01048　AS01210　AS01482　AS02652　⋮　AS05538　AS05803 | AS01076　AS01238　AS01577　AS02859　⋮　AS05760　AS05952 | AS01143　AS01385　AS01722　AS02913　⋮　AS05772　AS05988 |
| ⋮ | ⋮ | | |

[FIG. 21]

| BUSINESS ENTITY ID | USAGE FEE | ACCOUNT INFORMATION |
|---|---|---|
| ackekgjely | 68,521 | NB385 - 21176 |
| kgusymhp | 87,395 | NB720 - 18592 |
| ... | ... | ... |

[FIG. 22]
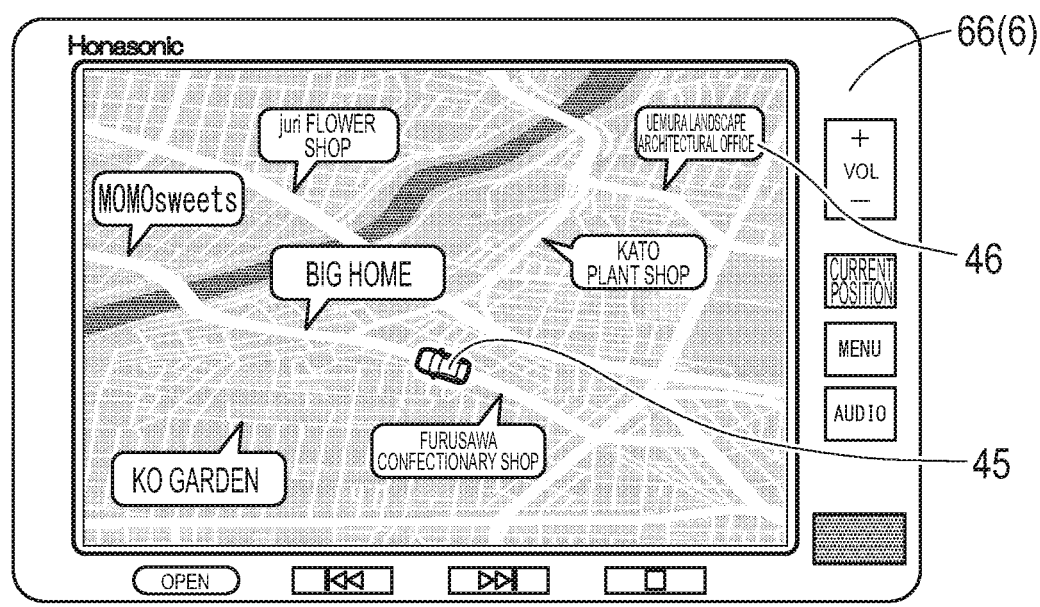

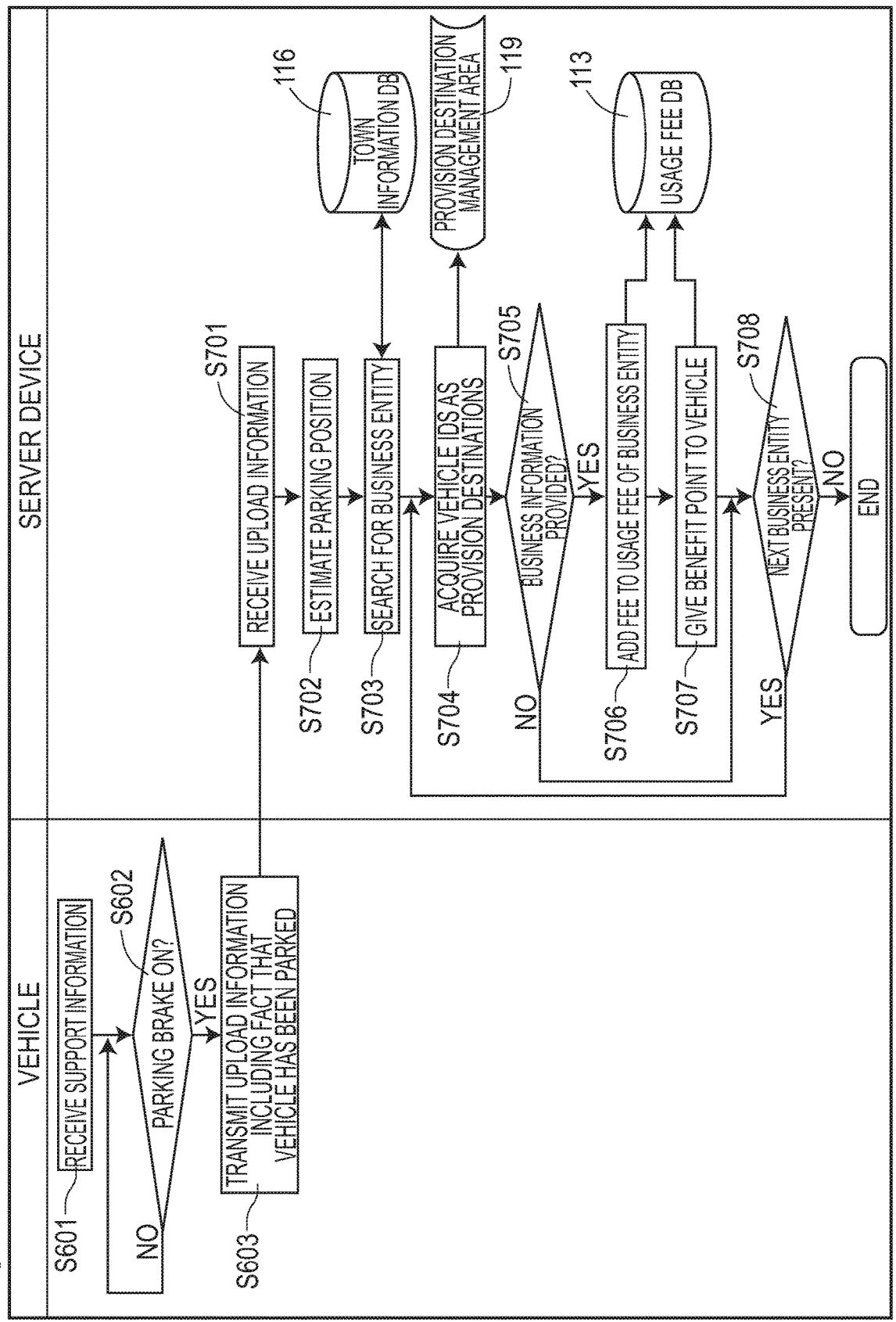
[FIG. 23]

DRIVING SUPPORT SYSTEM

TECHNICAL FIELD

The present invention relates to a driving support system using magnetic markers laid in a road.

BACKGROUND ART

Conventionally a driving support system using magnetic markers laid in a road has been known. For example, in Patent Literature 1 described below, a magnetic marker system for providing information to a vehicle side by using a combination of laying modes of magnetic markers is suggested.

CITATION LIST

Patent Literature

Patent Literature 1: Japanese Unexamined Patent Application Publication No. 2017-199247

SUMMARY OF INVENTION

Technical Problem

However, the above-described conventional magnetic marker system has the following problem. That is, burdens such as cost for laying magnetic markers in a road or operating cost for maintenance play a factor of inhibiting widespread use of the system using magnetic markers.

The present invention was made in view of the above-described conventional problem, and is to provide a driving support system capable of collecting usage fees from a system user side

Solution to Problem

The present invention resides in a driving support system including:

an information acquiring part which acquires, from a vehicle side detecting a magnetic marker laid in a road and capable of acquiring marker identification information for identifying the magnetic marker detected, upload information including the marker identification information;

a marker database having marker position information indicating a laying position of the magnetic marker recorded therein as being linked to the marker identification information;

an information providing part which provides the vehicle side as a transmission source of the upload information with support information including the marker position information to which the marker identification information included in the upload information is linked;

a usage fee totalizing part which totalizes usage fees to be charged to the vehicle side in accordance with a history of providing the support information;

an account database having registered therein account information, as information about accounts of a financial institution accessible from a public communication line, including an account from which the usage fees are withdrawn and a management account on a system side for collecting the usage fees withdrawn; and a payment request part which transmits a withdrawal request to an external server device of the financial institution which manages the account from which the usage fees are withdrawn in order to transfer an amount of money corresponding to the usage fees totalized by the usage fee totalizing part to the management account on the system side.

Advantageous Effects of Invention

The driving support system of the present invention totalizes usage fees to be charged to the side receiving provision of support information, and transmits the withdrawal request to the financial institution which manages the account from which the usage fees are withdrawn. According to this driving support system, the usage fees in accordance with the history of providing the support information can be collected, and thus it is possible to put at least a part of a burden of cost on the system side onto the vehicle side.

In this manner, according to the driving support system of the present invention, the usage fees can be collected from the side using the support information.

BRIEF DESCRIPTION OF DRAWINGS

FIG. 1 is a diagram of the configuration of a driving support system in the first embodiment.

FIG. 2 is a perspective view depicting a magnetic marker in the first embodiment.

FIG. 3 is a front view of an RFID tag in the first embodiment.

FIG. 4 is a descriptive diagram depicting a state in which a vehicle detects the magnetic marker in the first embodiment.

FIG. 5 is a block diagram depicting the configuration of the vehicle side in the first embodiment.

FIG. 6 is a block diagram depicting the configuration of a server device in the first embodiment.

FIG. 7 is a descriptive diagram exemplarily depicting changes of a magnetic measurement value in a traveling direction at the time of passing over the magnetic marker in the first embodiment.

FIG. 8 is a descriptive diagram exemplarily depicting a distribution of magnetic measurement values in a vehicle-width direction by magnetic sensors Cn arrayed in the vehicle-width direction in the first embodiment.

FIG. 9 is a flow diagram depicting a flow of operation of the driving support system in the first embodiment.

FIG. 10 is a descriptive diagram exemplarily depicting a usage fee of each vehicle recorded in a usage fee DB in the first embodiment.

FIG. 11 is a descriptive diagram of a charging process in the first embodiment.

FIG. 12 is a flow diagram depicting a flow of operation of a driving support system in the second embodiment.

FIG. 13 is a descriptive diagram exemplarily depicting a presentation screen of congestion information in the second embodiment.

FIG. 14 is a descriptive diagram exemplarily depicting a usage inquiry screen of congestion information in the second embodiment.

FIG. 15 is a descriptive diagram exemplarily depicting a driver selection screen in the third embodiment.

FIG. 16 is a descriptive diagram exemplarily depicting a transmission information selection screen in the third embodiment.

FIG. 17 is a block diagram depicting the configuration of a server device in the third embodiment.

FIG. 18 is a descriptive diagram exemplarily depicting business information stored in a town information DB in the third embodiment.

FIG. 19 is a flow diagram depicting a flow of operation of the server device in the third embodiment.

FIG. 20 is a descriptive diagram exemplarily depicting a business information provision destination list in the third embodiment.

FIG. 21 is a descriptive diagram exemplarily depicting a usage fee for each business entity stored in a usage fee DB in the third embodiment.

FIG. 22 is a descriptive diagram exemplarily depicting a business information display screen by a vehicle onboard display in the third embodiment.

FIG. 23 is a flow diagram depicting a flow of operation of the server device in the third embodiment.

DESCRIPTION OF EMBODIMENTS

Embodiments of the present invention are specifically described by using the following examples.

First Embodiment

The present embodiment is an example regarding to driving support system 1 using magnetic markers 10 laid in a road. This driving support system 1 is a system which supports driving of each vehicle 5 by providing support information by taking a usage fee collected from each vehicle 5 using the system as a counter value. Details of this are described with reference to FIG. 1 to FIG. 11.

Driving support system 1 is configured of, as in FIG. 1, a combination of vehicle 5 connectable to a public communication line such as Internet 19 and server device 11 which provides support information to vehicle 5. This driving support system 1 is operated by taking, as a target, a road where magnetic markers 10 having RFID (Radio Frequency IDentification) tag 15 (FIG. 2) integrally retained are laid. Driving support system 1 can be connected to external servers (server devices) 8 of financial institutions such as banks where accounts of users and an account on a system side are opened and card companies via, for example, Internet 19. Driving support system 1 collects usage fees by withdrawing the usage fees from the accounts of the users for paying (depositing) into the account on the system side.

In the following, after (1) magnetic marker 10 is generally described, (2) vehicle 5 and (3) server device 11 configuring driving support system 1 are described. Subsequently, (4) operation of driving support system 1 is described.

(1) Magnetic Marker

Magnetic marker 10 is a road marker configured of a columnar magnet having a diameter of 20 mm and a height of 28 mm, with an RFID tag 15 affixed to its end face, as in FIG. 2. Magnetic marker 10 is accommodated, for example, in each of holes bored with 10-meter pitches along the center of a lane divided by left and right lane marks.

The magnet forming magnetic marker 10 is a ferrite plastic magnet with magnetic powder of iron oxide as a magnetic material dispersed in a polymer material as a base material, and has a characteristic of a maximum energy product (BHmax)=6.4 kJ/m$^3$. This magnetic marker 10 makes magnetism act with magnetic flux density of 8 μT (microtesla) at a maximum height (250 mm) in a range from 100 mm to 250 mm assumed as an attachment height of measurement unit 2 (refer to FIG. 4) on vehicle 5 side.

On magnetic marker 10, as in FIG. 2, RFID tag 15 is laminated and arranged on the end face oriented upward when laid. RFID tag 15 as one example of a wireless tag operates by wireless external power feeding, and externally outputs a tag ID (one example of marker identification information) as unique identification information via wireless communication.

RFID tag 15 is an electronic part having IC chip 157 implemented on the surface of tag sheet 150 cut out from, for example, a PET (Polyethylene terephthalate) film as in FIG. 3. On the surface of tag sheet 150, a printed pattern of loop coil 151 and antenna 153 is provided. Loop coil 151 is a power-receiving coil in which exciting current occurs by external electromagnetic induction. The Antenna 153 is a transmission antenna for wirelessly transmitting position data and so forth.

(2) Vehicle

Vehicle 5 includes, as in FIG. 4, a measurement unit 2, tag reader 34, control unit 32, and a communication unit (not depicted) including a wireless communication function. Furthermore, vehicle 5 includes navigation device 6 which performs route guidance to a destination. Vehicle 5 can make a wireless connection to the public communication line via the communication unit. Vehicle 5 transmits upload information to server device 11 via the communication unit, and receives provision of support information from server device 11.

Measurement unit 2 is, as in FIG. 4 and FIG. 5, a unit with sensor array 21 which detects any magnetic marker 10 and IMU (Inertial Measurement Unit) 22 for achieving inertial navigation integrated together. Measurement unit 2 forming a long stick shape in a vehicle-width direction is attached, for example, to the inside of the front bumper of vehicle 5 or the like, in a state of facing road surface 100S. In the case of vehicle 5 of the present embodiment, the attachment height of measurement unit 2 with reference to the road surface 100S is 200 mm.

Sensor array 21 included in measurement unit 2 includes fifteen magnetic sensors Cn (n is an integer from 1 to 15) arrayed on a straight line along the vehicle-width direction and detection processing circuit 212 having incorporated therein a CPU and so forth not depicted. In this sensor array 21, fifteen magnetic sensors Cn are equidistantly arranged with 10-centimeter pitches.

Magnetic sensors Cn are sensors which detect magnetism by using the known MI effect (Magneto Impedance Effect) in which the impedance of a magneto-sensitive body such as an amorphous wire sensitively changes in response to the external magnetic field. In each magnetic sensor Cn, the magneto-sensitive bodies such as amorphous wires not depicted are arranged along two directions orthogonal to each other, thereby allowing detection of magnetism acting in the two directions orthogonal to each other. Note in the present embodiment that magnetic sensors Cn are incorporated in the sensor array 21 so as to be able to detect magnetic components in the traveling direction and the vehicle-width direction.

Magnetic sensors Cn are highly-sensitive sensors having a measurement range of the magnetic flux density of ±0.6 mT and a magnetic flux resolution of 0.02 μT within the measurement range. To support high-speed traveling of vehicle 5, each magnetic sensor Cn performs magnetic measurement in a cycle of 3 kHz.

Here, as described above, magnetic marker 10 can make magnetism act with a magnetic flux density equal to or larger than 8 μT in a range from 100 mm to 250 mm assumed as the attachment height of magnetic sensors Cn. With magnetic marker 10 making magnetism act with a magnetic flux density equal to or larger than 8 μT, detection can be made with high reliability by using magnetic sensors Cn with the magnetic flux resolution of 0.02 µT.

Detection processing circuit 212 (FIG. 5) of sensor array 21 is an arithmetic circuit which performs a marker detection process for detecting any magnetic marker 10. This detection processing circuit 212 is configured by using a CPU (central processing unit) which performs various computations as well as memory elements such as a ROM (read only memory) and a RAM (random access memory), and so forth.

Detection processing circuit 212 acquires a sensor signal outputted from each of magnetic sensors Cn in a cycle of 3 kHz to perform a marker detection process, and inputs the detection result to control unit 32. Although details will be described further below, in this marker detection process, in addition to the result of detection of magnetic marker 10, a lateral shift amount of vehicle 5 with respect to detected magnetic marker 10 is measured.

IMU 22 incorporated in measurement unit 2 is an inertial navigation unit which estimates a relative position of vehicle 5 by inertial navigation. IMU 22 includes biaxial magnetic sensor 221 as an electronic compass which measures an azimuth, biaxial acceleration sensor 222 which measures acceleration, and biaxial gyro sensor 223 which measures angular velocity. IMU 22 uses the measured acceleration, angular velocity and so forth to compute the relative position with respect to a reference position.

Tag reader 34 included in vehicle 5 is a communication unit which wirelessly communicates with RFID tag 15 (FIG. 2) laminated and arranged on the end face of columnar-shaped magnetic marker 10. Tag reader 34, which is a unit of acquiring the tag ID as marker identification information wirelessly transmits electric power required for operation of RFID tag 15, and receives information transmitted from RFID tag 15. The transmission information of RFID tag 15 includes the tag ID as identification information (marker identification information) of RFID tag 15. Note that tag reader 34 may be incorporated in measurement unit 2 for integration.

Control unit 32 included in vehicle 5 is a unit for controlling measurement unit 2 and tag reader 34 as well as identifying an own vehicle position as the position of vehicle 5 on a real-time basis. This control unit 32 includes an electronic board (not depicted) having implemented thereon a CPU which performs various computations as well as memory elements such as a ROM and a RAM.

A method of identifying the own vehicle position by control unit 32 is different when vehicle 5 arrives at the laying position of any magnetic marker 10 and when vehicle 5 is positioned in the middle of adjacent magnetic markers 10. Although details will be described further below, in the former case, control unit 32 identifies the own vehicle position by using support information provided from server device 11 at the time of detection of any magnetic marker 10. On the other hand, in the latter case, the own vehicle position is identified based on the relative position of vehicle 5 estimated by inertial navigation. Control unit 32 inputs the own vehicle position in navigation device 6 which performs, for example, route guidance to the destination or the like.

(3) Server Device

Server device 11 is an arithmetic operation processing device which includes, as in FIG. 6, main circuit 110 configured of an electronic board not depicted with a CPU implemented thereon and so forth and, to this main circuit 110, a storage device not depicted such as a hard disk is connected. In main circuit 110, a communication function supporting a LAN (Local Area Network) not depicted is provided. Server device 11 is connectable to the public communication line such as Internet 19 via a communication cable connected to a LAN port (refer to FIG. 1).

Server device 11 includes upload information acquiring part (information acquiring part) 123 which acquires upload information from each vehicle 5 via the public communication line such as Internet 19 and support information providing part (information providing part) 124 which distributes support information to each vehicle 5 similarly. Furthermore, server device 11 includes usage fee totalizing part 122 which totalizes the usage fee of each vehicle 5 and payment request part 121 which transmits a withdrawal request to external servers 8 of financial institutions.

In server device 11, by using storage areas of the storage device connected to main circuit 110, marker database (marker DB) 111, usage fee database (usage fee DB) 113, and account database (account DB) 114 are provided. Marker DB 111 is a database having marker position data (marker position information) indicating the laying positions of magnetic markers 10 stored therein. Usage fee DB 113 is a database having the usage fee of each vehicle 5 recorded therein. Account DB 114 is a database having account information registered in advance for each vehicle stored therein. Furthermore, for example, in a storage area of main circuit 110 configured of a RAM or the like, transmission source management area 118 is provided for registering a vehicle ID as identification information of vehicle 5 which is the transmission source of upload information.

(4) Operation of Vehicle Driving Support System

Regarding details of the operation of the above-configured driving support system 1, (a) marker detection process by vehicle is first described with reference to FIG. 7 and FIG. 8. Subsequently, with reference to a flow diagram of FIG. 9, (b) upload information transmission process by vehicle 5 and (c) support information transmission process by server device 11 are described. Furthermore, (d) the data configuration of usage fee DB 113 and (e) a charging process are described with reference to FIG. 10 and FIG. 11, respectively.

(a) Marker Detection Process

While vehicle 5 is traveling on a road, sensor array 21 (FIG. 5) of measurement unit 2 repeatedly performs marker detection process for detecting any magnetic marker 10.

As described above, magnetic sensors Cn (FIG. 5) can measure magnetic components in the traveling direction and the vehicle-width direction of vehicle 5. For example, when these magnetic sensors Cn move in the traveling direction to pass directly above any magnetic marker 10, the magnetic measurement value in the traveling direction has its sign reversed before and after magnetic marker 10 as in FIG. 7 and changes so as to cross zero at a position directly above magnetic marker 10. Therefore, during traveling of vehicle 5, when zero-cross Zc occurs in which the sign of magnetism in the traveling direction detected by any magnetic sensor Cn is reversed, it can be determined that measurement unit 2 is positioned directly above magnetic marker 10. Detection processing circuit 212 (FIG. 5) determines that magnetic marker 10 is detected when measurement unit 2 is positioned directly above magnetic marker 10 and zero-cross Zc of the magnetic measurement value in the traveling direction occurs as described above.

Also, for example, as for a magnetic sensor with the same specification as that of magnetic sensors Cn, assume movement along a virtual line in the vehicle-width direction passing directly above magnetic marker 10. In this case, the magnetic measurement value in the vehicle-width direction has its sign reversed on both sides across magnetic marker 10 and changes so as to cross zero at a position directly above magnetic marker 10. In the case of measurement unit 2 having fifteen magnetic sensors Cn arrayed in the vehicle-width direction, as in the example of FIG. 8, the sign of magnetism in the vehicle-width direction to be detected by any magnetic sensor Cn varies depending on which side the sensor is present with respect to magnetic marker 10.

Based on the distribution of FIG. 8 exemplarily depicting magnetic measurement values of respective magnetic sensors Cn of measurement unit 2 in the vehicle-width direction, an intermediate position between adjacent two magnetic sensors Cn across zero-cross Zc where the sign of magnetism in the vehicle-width direction is reversed or a position directly below magnetic sensor Cn where the detected magnetism in the vehicle-width direction is zero and the signs of magnetic sensors Cn on both outer sides are reversed is the position of magnetic marker 10 in the vehicle-width direction. Detection processing circuit 212 measures a deviation of the position of magnetic marker 10 in the vehicle-width direction with respect to the center position (position of the magnetic sensor C8) of measurement unit 2 as a lateral shift amount of vehicle 5 with respect to magnetic marker 10. For example, in the case of FIG. 8, the position of zero-cross Zc is a position corresponding to C9.5 in the neighborhood of a midpoint between C9 and C10. As described above, since the pitch between magnetic sensors C9 and C10 is 10 centimeters, the lateral shift amount of vehicle 5 with respect to magnetic marker 10 is (9.5−8)×10 centimeters with reference to C8 positioned at the center of measurement unit 2 in the vehicle-width direction.

(b) Process of Transmitting Upload Information

As in FIG. 9, when sensor array 21 of vehicle 5 performs the above-described marker detection process P1 to detect any magnetic marker 10 (S101: YES), tag reader 34 performs tag ID reading process for reading the tag ID of RFID tag 15 (S102). Tag reader 34 wirelessly transmits electric power required for operation of RFID tag 15 to start the operation of RFID tag 15 and receives transmission data (such as the tag ID) of RFID tag 15.

Then, tag reader 34 inputs the received tag ID to control unit 32. Control unit 32 generates upload information including the tag ID (S103), and transmits to server device 11 the generated information with a vehicle ID as identification information of vehicle 5 linked thereto.

(c) Process of Transmitting Support Information

As in FIG. 9, upon acquiring the upload information from vehicle 5 side (S201), server device 11 records the vehicle ID linked to the upload information in transmission source management area 118, thereby registering vehicle 5 as the transmission source of the upload information as a provision destination of the support information (S202). With this registration of the provision destination of the support information, server device 11 grants an information acquisition right, which is the right to receive support information, to vehicle 5. Note that to the vehicle ID recorded in transmission source management area 118, an information ID is linked, which is an identification code of the upload information.

Also, server device 11 refers to marker DB 111 having the marker position data (marker position information) indicating the laying position of each magnetic marker 10 stored therein (S203). From among the marker position data stored in marker DB 111, server device 11 selectively acquires marker position data of magnetic marker 10 related to the tag ID included in the upload information (S204).

Server device 11 generates support information including the marker position data acquired from marker DB 111. Then, server device 11 transmits this support information to vehicle 5, which is the transmission source of the upload information acquired at the above-described step S201 and has acquired the information acquisition right (S205). Specifically, from among the vehicle IDs recorded in transmission source management area 118 as described above, the vehicle ID with the information ID of the upload information acquired at the above-described step S201 linked thereto is selected, and support information is provided to vehicle 5 associated with this vehicle ID. Note that the vehicle ID recorded in transmission source management area 118 is deleted as occasion demands in response to transmission of support information.

Upon transmitting support information to vehicle 5 side, server device 11 adds a fee for the support information to the usage fee managed by usage fee DB 113, which will be described further below, as for vehicle 5 as the transmission destination (S206). This allows the counter value of providing the support information to be acquired as the usage fee from vehicle 5 side.

When provided with the support information including the marker position data from server device 11 (S104), control unit 32 of vehicle 5 identifies the vehicle position with reference to the laying position of magnetic marker 10 indicated by this marker position data (S105). Specifically, with reference to the laying position of magnetic marker 10, computation is performed to offset the position by the lateral shift amount measured by the measurement unit 2 in the above-described manner, thereby finding the vehicle position. For example, navigation device 6 with the vehicle position inputted from control unit 32 handles this vehicle position as the own vehicle position and performs route guidance and so forth.

Note that in a traveling section after any magnetic marker 10 is detected until new magnetic marker 10 is detected (S101: NO), control unit 32 estimates the relative position of vehicle 5 by inertial navigation by taking the vehicle position at the time of detection of magnetic marker 10 as a reference position (S112). Specifically, IMU 22 (FIG. 5) incorporated in measurement unit 2 performs second-order integration of the measurement acceleration by biaxial acceleration sensor 222 (FIG. 5) to compute a displacement amount, and further performs computation of integrating displacement amounts along a forwarding azimuth of vehicle 5 measured by biaxial gyro sensor 223 (FIG. 5) and so forth. With this, control unit 32 estimates the relative position of vehicle 5 with respect to the above-described reference position. Then, a position acquired by moving from the reference position by this relative position is identified as the own vehicle position (S105).

(d) Data Configuration of Usage Fee DB

As in FIG. 10, usage fee DB 113 is a database for managing the usage fee charged to each user. Note that in the present embodiment that a user per vehicle is assumed. In usage fee DB 113, for the vehicle ID of each vehicle, the usage fee as the counter value of providing support information or the like is recorded. Also, to each vehicle ID in usage fee DB 113, bank account information registered in advance in account DB 114 is linked as a location from which the usage fee of each vehicle 5 is collected.

(e) Charging Process

As in FIG. 11, server device 11 determines the usage fee of each vehicle 5 for each month, for example, and makes withdrawal requests to external servers 8 of the financial institutions. This withdrawal request includes account information which identifies account 81 registered for vehicle 5 as a charging target, account information which identifies management account 88 as a remittance destination managed by the system side, and information such as the usage fee to be collected.

For example, as in FIG. 11, if account 81 on the vehicle side from which the usage fee is to be withdrawn and management account 88 on the system side which collects the withdrawn usage fee are those of the same financial institution, in response to a withdrawal request to external server 8 of that financial institution, the amount of money corresponding to the usage fee can be transferred between the accounts. On the other hand, account 81 on the vehicle side and management account 88 on the system side are those of different financial institutions, the withdrawal request is transmitted to each of external servers 8 of both financial institutions, and money transfer between the accounts is achieved in response to exchanges of information between external servers 8.

In this manner, driving support system 1 of the present embodiment is a system which provides vehicle 5 detecting any magnetic marker 10 with support information including marker position data indicating the laying position of that magnetic marker 10. On vehicle 5 side, based on the laying position of magnetic marker 10, the position of the own vehicle can be accurately identified. If this driving support system 1 is used, the vehicle position can be accurately grasped even when an environment, an equipment, or a situation, for example, does not allow electric waves from a GPS (Global Positioning System) satellite to be received.

In this driving support system 1, the usage fees are totalized for each vehicle 5 as a support information user, and a withdrawal request is transmitted to the financial institution which manages the account of the user. According to this driving support system 1, the usage fees can be collected in accordance with a history of providing support information, and thus it is possible to charge the user side at least part of cost on the system side.

In driving support system 1, since the usage fees are collected from vehicle 5 side in accordance with the history of provision of support information, at least part of the cost required for laying magnetic markers 10 and the cost required for system operation such as maintenance can be collected from vehicle 5 side as the user. Since the cost on the system side can be covered in accordance with charging vehicle 5 side as the user, it is easy to raise money for the laying cost of magnetic markers 10 and so forth, and it is easy to expand routes where magnetic markers 10 are laid. And, if the routes where magnetic markers 10 are laid increase, situations in which the magnetic markers 10 cannot be used can be decreased. Thus, convenience of driving support system 1 can be further improved, and collection of usage fees from vehicle 5 side becomes more easy.

Note that whether or not to receive provision of support information including marker position data may be selectively settable by selection operation or selection process on the vehicle side. For example, on roads at a city center with buildings bristling or in a mountainous area, the reception state of GPS waves is not sufficient, and thus it may become impossible to appropriately carry out an instruction such as a right turn, a left turn, or the like during route guidance by the navigation device. On the other hand, if support information including marker position data is provided, it is possible to perform appropriate route guidance without depending on the reception state of GPS waves. For example, during traveling roads at a city center with buildings bristling or in a mountainous area, the state of receiving provision of support information may be set by selection operation by the driver or selection process by the navigation device.

In the present embodiment, exemplarily depicted is the server device 11 integrally including support information providing part 124 which provides support information to vehicle 5 side, marker DB 111 storing the marker position data indicating the laying position of each magnetic marker 10 and so forth. The functions of server device 11 of the present embodiment may be implemented by a plurality of devices. The plurality of devices may be remotely set as long as they are communicably connected via a public communication line such as Internet 19, a dedicated communication line, or the like.

Note that control information for automatic driving of vehicle 5 may be provided to each vehicle 5 as support information. For example, vehicle 5 transmitting the upload information including the lateral shift amount with respect to magnetic marker 10 may be provided with control information such as a steering operation angle and an accelerator opening for the vehicle to travel along the road where magnetic markers 10 are arrayed. In this case, automatic traveling of vehicle 5 along magnetic markers 10 can be achieved by the control information included in the support information as service information. On server device 11 side, there is a merit in which the vehicle position can be accurately identified by acquiring the lateral shift amount. The usage fee for the support information including the control information may be collected from vehicle 5 side. Note that it may also be configured such that a selection screen as to whether or not to use automatic driving is displayed on a vehicle onboard display to allow vehicle 5 side to select whether or not to receive provision of control information. Automatic driving is preferably used when, for example, easy driving on the way home from vacation.

Note that in addition to the tag ID of magnetic marker 10, the lateral shift amount measured at the time of detection may be included in the upload information. In this case, unstable traveling such as meandering driving and lane departure can be detected on server device 11 side. Warning information regarding unstable traveling may be included in the support information, and the usage fee for the warning information may be collected from the vehicle side. Note that it may also be configured such that the selection screen as to whether or not to use warning function is displayed on the vehicle onboard display to allow vehicle 5 side to select whether or not to receive provision of warning information. The warning function is preferably used when, for example, you are tired or sleepy.

Second Embodiment

The present embodiment is an example in which a configuration based on the driving support system of the first embodiment is changed so as to allow chargeable congestion information to be provided. Details of this are described with reference to FIG. 12 to FIG. 14.

An operation when the driving support system of the present embodiment provides support information including congestion information is described along a flow diagram of FIG. 12. Here, for example, a flow of operation is described by taking, as a starting point, a procedure of providing a vehicle side with congestion information (S301), for example, externally acquired by a server device, as being included in the support information.

When acquiring a congestion information included in a support information (S401), a control unit (reference sign 32 of FIG. 5, which is referred to in the first embodiment) on the vehicle side presents the congestion information on a display screen of vehicle onboard display 66 as in FIG. 13 if route guidance is being performed by navigation device 6 and a congestion section or the like is present near a route being guided (S402). Furthermore, an inquiry screen (FIG. 14) as to whether or not to perform route recalculation of a route by using the congestion information is displayed on vehicle onboard display 66 (S403).

When "Yes" is selected on the inquiry screen of FIG. 14 (S404: YES), the control unit transmits to the server device a request signal for congestion information data (data for navigation) required for route recalculation (S405). Then, the control unit performs route recalculation by using the data for navigation transmitted by the server device (S302: YES→S303) in response to this request signal (S406). On the vehicle side, route guidance is performed for guidance to the route recalculated by navigation device 6 (S407). On the other hand, upon transmitting the data for navigation (S303), the server device refers to a usage fee of the vehicle as a transmission destination recorded in usage fee DB 113 to add the fee for the congestion information (S304).

Note that in addition to the congestion information, traffic information such as a construction section and a restricted section may be provided as being included in the support information. The usage fee for provision of traffic information may be collected from an administrative side which manages roads, may be collected from the vehicle side receiving provision of traffic information, or may be collected from both. As with the above-described congestion information, the usage fee may be collected when the traffic information is used for route calculation.

Note that other configurations and operations and effects are similar to those of the first embodiment.

Third Embodiment

The present embodiment is an example in which a configuration based on the driving support system of the first embodiment is changed so as to allow support information including business information regarding shops and services to be provided. In this driving support system, in addition to collecting a usage fee from a vehicle side as a counter value of providing marker position data, the usage fee is collected from a business entity side as the counter value of providing business information to the vehicle. Details of this are described with reference to FIG. 15 to FIG. 23.

In each vehicle supporting the driving support system of the present embodiment, an attribute database (attribute DB, not depicted) capable of storing attribute information of vehicles and drivers in advance is provided to a control unit (corresponding to a reference sign 32 in FIG. 5). Also, the control unit can display an attribute input screen (not depicted) for the attribute information and a driver selection screen (FIG. 15) for selecting a driver as well as a transmission information selection screen (FIG. 16) for setting transmission information of the attribute information to be included in the upload information and so forth on vehicle onboard display 66.

On the attribute input screen (not depicted), personal information of a driver such as gender, age, hobby, and occupation can be inputted. These attribute information inputted via the attribute input screen are stored in the attribute DB of the control unit. Note that the attribute DB may be provided to the server device.

The driver selection screen (selection operating part) exemplarily depicted in FIG. 15 is an example of a screen where, for example, a father, a mother, a son, and a daughter each having a driver's license are displayed among family members configuring a family having a vehicle. For example, when the mother is to drive, by touching inside corresponding display frame 43 for operation, herself (mother) can be set as a driver. With the driver thus selected, by control from the control unit, the display screen on vehicle onboard display 66 is switched to the transmission information selection screen of FIG. 16.

The transmission information selection screen (selection operating part) exemplarily depicted in FIG. 16 is a selection screen supporting, for example, the mother as a driver selected on the driver selection screen (FIG. 15). On this transmission information selection screen, the personal information of the driver is selectably displayed. When any display frame 44 is touched for operation, that display frame 44 is switched to hatching by control of the control unit, and its corresponding information is set as transmission information. Note that if display frame 44 displayed by hatching is touched again for operation, setting can be released, and external transmission of the corresponding information can be stopped.

Next, server device 11 (FIG. 17) includes town information database (town information DB) 116 storing business information regarding shops, services and so forth. Server device 11 can provide the business information stored in town information DB 116 as being included in the support information. Also, in usage fee DB 113 of server device 11, in addition to the usage fee charged to each vehicle, the usage fee charged to each business entity as a provision source of the business information is recorded and managed. Furthermore, main circuit 110 of server device 11 is provided with, in addition to transmission source management area 118 for managing vehicle IDs of the transmission sources of the upload information, provision destination management area 119 for managing the vehicle IDs of the provision destinations of the business information for each business entity.

In town information DB 116, for example, as in FIG. 18, business entities and so forth providing products and services are managed with business entity IDs as identification information, and, for example, information regarding business entities and so forth is stored as being divided for each area such as A5. As information regarding business entities and so forth, there are information, data, or the like including a name, location (latitude/longitude), business type, target group assumed as customers, comment, and location (address).

Each business entity can selectively set a provision type of business information in advance. As provision types of business information, for example, there are a type 1 of randomly providing business information to vehicles positioned in a range of, for example, 500 meters around the location of the business entity with reference thereto, and a type 2 of limiting a target group to which business information is to be provided. As target groups, gender-based or age-based groups can be set, such as an F1 group of females aged 20 to 34 years and an M1 group of males aged 20 to 34 years.

Next, details of the operation of the driving support system are described. With reference to FIG. 19, (a) a flow of process of transmitting support information including business information is described and, subsequently, with reference to FIG. 23, (b) a flow of charging process when the business information is used is described.

(a) Support Information Transmission Process

When transmitting the upload information in response to detection of a magnetic marker, the control unit on the vehicle side transmits, in addition to a tag ID of the detected magnetic marker, for example, transmission information (personal information) selected on the transmission information selection screen of FIG. 16 as being includes in the upload information.

As in FIG. 19, upon receiving the upload information from the vehicle side (S501), server device 11 first records the vehicle ID linked to the upload information in transmission source management area 118, thereby registering the vehicle as the transmission source of the upload information as the provision destination of support information (S502). With this registration of the provision destination of support information, server device 11 grants an information acquisition right, which is the right to receive support information, to the vehicle. Note that to the vehicle ID recorded in transmission source management area 118, an information ID is linked, which is an identification code of the upload information.

Subsequently, server device 11 refers to marker DB 111 storing the marker position data (marker position information) indicating the laying position of each magnetic marker (S503), and acquires, from the stored marker position data, the marker position data of the magnetic marker associated with the tag ID included in the upload information (S504). Then, server device 11 generates support information including the marker position data acquired from marker DB 111 (S505). If personal information is not included in the upload information (S506: NO), this support information is transmitted as it is (S512), and as with the first embodiment, a fee is added to the usage fee of the vehicle (S513).

If personal information is included in the upload information (S506: YES), server device 11 refers to town information DB 116, and searches for business information present in a range of, for example, 500 meters around the marker position data acquired at step S504 with reference thereto (S507).

Server device 11 sequentially checks the set provision types for the searched business information (S508). In the case of provision type 1 in which the provision destination of the business information is not limited (S508: value 1), that business information is incorporated in the support information (S509). And, to incorporate the business information in the support information, the vehicle IDs of the vehicles as provision destinations are sequentially recorded in provision destination management area 119. Specifically, the vehicle IDs as provision destinations are registered in a provision destination list (FIG. 20) for each business entity recorded in provision destination management area 119. Note in the provision destination list in the drawing that the vehicle IDs are registered with a time limitation, and are sequentially deleted with a lapse of a predetermined time of, for example, ten minutes.

Also, server device 11 adds a fee as a fee for providing business information to the usage fee charged to the business entity (business entity associated with the business information) as a provision source of the business information incorporated at step S509 (S510). Note that in usage fee DB 113, the usage fee is recorded and managed for each business entity, and the account information stored in account DB 114 registered in advance to withdraw the usage fee of each business entity is managed as linked to the business ID (refer to FIG. 21).

On the other hand, if the provision type set to the business information is 2 and the information provision destination is limited to the target group (S508: value 2), server device 11 determines whether or not the personal information included in the upload information matches the target group (refer to FIG. 18) set to the business information (S529). If the personal information matches the target group (S529: YES), as with the flow of process described in the case of the provision type 1, server device 11 incorporates that business information into the support information (S509), and adds a fee as an information provision fee to the usage fee of the business entity (S510). If the personal information does not match the target group (S529: NO), the processes at step S509 of incorporating that business information into the support information and at step S510 of adding a fee to the usage fee of the business entity are detoured.

Server device 11 repeatedly performs processes from step S508 to step S510 for each piece of business information searched at the above-described step S507 (S511: present). Then, after the process regarding all pieces of business information ends (S511: none), the marker position data as well as the support information having the business information incorporated therein is transmitted to the vehicle side (S512) and, as with the first embodiment, the fee for the support information including the marker position data is added to the usage fee of the vehicle managed in usage fee DB 113 (S513). Note that the usage fee on the vehicle side may be free at the time of provision of the business information.

On the vehicle side acquiring the support information including the business information, for example, an information display screen exemplarily depicted in FIG. 22 can be displayed on vehicle onboard display 66. On this information display screen, business information such as shops near the own vehicle indicated by icon 45 is displayed. For example, when any display frame 46 is touched for operation, switching may be made to a display screen of information such as the address, telephone number, comments, and so forth of the relevant business entity, or pop-up display may be made. Note that when any display frame 46 is touched for operation on the vehicle side, that information may be transmitted to server device 11. With this configuration, the usage fee as a fee for providing detailed information can be charged to the business entity.

(b) Charging Process when Business Information is Used

In the driving support system of the present embodiment, the vehicle as a provision destination of the business information is moved to be parked at a location where the business entity associated with that business information carries on the business (location associated with the business information), it is determined that that vehicle (parked vehicle) has used that business information. Then, in this case, while a fee as a contingent fee on the system side is added to the usage fee on the business entity side to allow collection of the contingent fee, a benefit point usable for payment of the usage fee is given to the vehicle side as a usage benefit.

As in a flow diagram of FIG. 23, after receiving the support information including the business information (S601), when the engine is stopped and the parking brake is operated (S602: YES), the control unit on the vehicle side externally outputs upload information including the fact that the vehicle has been parked (S603).

Upon receiving from the vehicle side the upload information including the fact that the vehicle has been parked (S701), server device 11 performs process of estimating the parking position (S702). For example, the laying position of the magnetic marker corresponding to the tag ID included in the upload information received immediately before may be estimated as the parking position.

Server device 11 refers to town information DB 116 and searches for the business entity located in a range of, for example, 200 meters with reference to the parking position estimated at step S702 (S703). Then, for example, with reference to the provision destination list exemplarily depicted in FIG. 20, for each business entity found by searching, a list of vehicle IDs providing the business information is acquired (S704). Then, it is determined whether or not the vehicle ID associated with the parked vehicle as the transmission source of the upload information at step S701 is present among these vehicle IDs, that is, whether or not the searched business entity provided business information to the parked vehicle (S705). Here, as described above, vehicles as information provision destinations are registered in the provision destination list with a time limitation of ten minutes. Thus, the determination at step S705 is a determination as to whether the parked vehicle is a vehicle providing information within the last ten minutes.

When the business entity is the one providing the business information to the parked vehicle (S705: YES), server device 11 adds a fee as a contingent fee on the system side to the usage fee of that business entity managed in usage fee DB 113 (S706), thereby allowing collection of the contingent fee. Furthermore, to the vehicle side using the business information, a benefit point usable for payment of the usage fee is given (S707, point giving part). Then, server device 11 performs the above-described process for all business entities searched at step S703 (S708: YES) and, after ending the process for all business entities (S708: NO), ends the series of processes with vehicle parking.

According to the driving support system of the present embodiment, the usage fee as an information provision fee can be collected from the business entity providing business information for advertisement. Furthermore, when the business information is used by the vehicle side and a shop as a provision source of the business information (location associated with the business information) or the like is visited, the contingent fee can be collected from the business entity side. On the other hand, to the vehicle side using the business information, a point usable for payment of the usage fee is given as a benefit. According to this benefit, the vehicle side can be motivated to utilize the business information, and thus the use of the business information on the vehicle side can be promoted, and provision of the business information from the business entity side can be promoted. And, if the provision and use of the business information become active, revenues of usage fees can be enhanced.

In the driving support system of the present embodiment, when the vehicle which received provision of the support information including the business information is moved and parked at the location such as a shop providing business associated with the business information, that business information is determined as having been used by the vehicle side, and payment of the contingent fee is imposed on the business entity side. In place of this, when a product associated with the business information is purchased or a service as a labor is used by taking money as a counter value, payment of the contingent fee may be imposed on the business entity. As a service as a labor, for example, there are a haircut at a barber shop, provision of food and drink at a restaurant or the like, and so forth.

Note that other configurations and operations and effects are similar to those of the first embodiment.

In the foregoing, specific examples of the present invention are described in detail as in the embodiments, these specific examples merely disclose examples of technology included in the scope of claims for patent. Needless to say, the scope of claims for patent should not be restrictively construed based on the configuration, numerical values and so forth of the specific examples. The scope of claims for patent includes techniques acquired by variously modifying, changing, or combining as appropriate the above-described specific examples by using known techniques, knowledge of a person skilled in the art and so forth.

REFERENCE SIGNS LIST

1 driving support system
10 magnetic marker
11 server device
111 marker database (marker DB)
113 usage fee database (usage fee DB)
114 account database (account DB)
121 payment request part
122 usage fee totalizing part
123 upload information acquiring part (information acquiring part)
124 support information providing part (information providing part)
118 transmission source management area
15 RFID tag (wireless tag)
2 measurement unit
21 sensor array
212 detection processing circuit
32 control unit
34 tag reader
5 vehicle
6 navigation device
8 external server
81 (vehicle-side) account
88 (system-side) management account

The invention claimed is:

1. A driving support system comprising:
an information acquiring part which acquires, from a vehicle side detecting a magnetic marker laid in a road and capable of acquiring marker identification information for identifying the magnetic marker detected, upload information including the marker identification information;
a marker database having marker position information indicating a laying position of the magnetic marker recorded therein as being linked to the marker identification information;
an information providing part which provides the vehicle side as a transmission source of the upload information with support information including the marker position information to which the marker identification information included in the upload information is linked;
a configuration which provides information acquisition right which is a right to receive the support information to the vehicle;
a transmission source management area for registering the identification information of the vehicle as a provision destination of the support information by recording the identification information of the vehicle;
a usage fee totalizing part which totalizes usage fees to be charged to the vehicle side in accordance with a history of providing the support information;
an account database having registered therein account information, as information about accounts of a financial institution accessible from a public communication line, including an account from which the usage fees are withdrawn and a management account on a system side for collecting the usage fees withdrawn; and a payment request part which transmits a withdrawal request to an external server device of the financial institution which manages the account from which the usage fees are withdrawn in order to transfer an amount of money corresponding to the usage fees totalized by the usage fee totalizing part to the management account on the system side, wherein the identification information of the vehicle is recorded in the transmission source management area and the information acquisition right is granted to the vehicle when the information acquiring part acquire the upload information, and the identification information of the vehicle recorded in the transmission source management area is deleted in response to transmission of the support information.

2. The driving support system in claim 1, wherein the information providing part provides support information including business information of a business entity, and the usage fee totalizing part totalizes the usage fees to be charged to the business entity associated with the business information in accordance with the history of providing the support information including the business information.

3. The driving support system in claim 2, wherein, when the vehicle which received provision of the support information including the business information moves to a location associated with the business information or a product associated with the business information is purchased or a service associated therewith is used, the usage fee totalizing part charges the usage fees to the business entity associated with the business information.

4. The driving support system in claim 2, comprising a point giving part which gives, when the vehicle which received provision of the support information including the business information moves to the location associated with the business information or the product associated with the business information is purchased or the service associated therewith is used, a point usable for payment of the usage fees to the vehicle side.

5. The driving support system in claim 1, wherein a wireless tag which outputs unique identification information via wireless communication is laid on the magnetic marker, and the marker identification information is the identification information of the wireless tag annexed to the magnetic marker.

6. The driving support system in claim 1, comprising a configuration which receives a selection operation for selectively setting whether or not to receive the provision of the support information, or a configuration which performs a selection process for selectively setting whether or not to receive the provision of the support information, wherein the support information is provided to the vehicle when to receive the provision of the support information is set by the selection operation or the selection process.

7. The driving support system claim 1, wherein the upload information includes information including a lateral shift amount of the vehicle with respect to the magnetic marker, and the information providing part provides the vehicle having transmitted the upload information including the lateral shift amount with information for traveling of the vehicle along the road where the magnetic marker is arrayed as the support information.

8. The driving support system in claim 7, comprising a configuration for selecting whether or not to use automatic driving by a control for the vehicle to travel along the road where the magnetic marker is arrayed, wherein the information providing part provides the vehicle having selected to use the automatic driving with the support information including control information for traveling of the vehicle along the road where the magnetic marker is arrayed, and the usage fee totalizing part charges the usage fee of the support information including the control information.

9. The driving support system in claim 1, comprising an attribute database storing attribute information of the vehicle or a driver, and a configuration which sets an attribute information to be included in the upload information among the attribute information stored in the database, wherein the information providing part selects information to be included in the support information in accordance with the attribute information included in the upload information.

10. The driving support system in claim 2, comprising an operation part operable to display the business information, and a display part which displays the business information when the operation part receives an operation, wherein the usage fee totalizing part charges the usage fee to the business entity associated with the business information when the business information is displayed by the operation to the operation part.

11. The driving support system in claim 2, comprising:

a provision destination management area for managing a provision destination list of the business information for each business entity by recording the identification information of the vehicle, a configuration which estimates a parking position of the vehicle when the upload information indicating that the vehicle has been parked is received from the vehicle side, a configuration which searches the business entity located in a predetermined range with reference to the parking position of the vehicle, and a configuration which determines whether or not the identification information of the vehicle as the transmission source of the upload information is in the provision destination list of the business entity searched by the configuration, wherein the identification information of the vehicle recorded in the provision destination management area is deleted with a lapse of a predetermined time, and the usage fee totalizing part charges the usage fee to the business entity associated with the provision destination list when it is determined that the identification information of the vehicle as the transmission source is in the provision destination list.

12. The driving support system in claim 4, comprising:

a provision destination management area for managing a provision destination list of the business information for each business entity by recording the identification information of the vehicle, a configuration which estimates a parking position of the vehicle when the upload information indicating that the vehicle has been parked is received from the vehicle side, a configuration which searches the business entity located in a predetermined range with reference to the parking position of the vehicle, and a configuration which determines whether or not the identification information of the vehicle as the transmission source of the upload information is in the provision destination list of the business entity searched by the configuration, wherein the identification information of the vehicle recorded in the provision destination management area is deleted with a lapse of a predetermined time, and the point giving part gives the point to the vehicle side when it is determined that the identification information of the vehicle as the transmission source is in the provision destination list.

13. The driving support system in claim 6, wherein the information providing part provides support information including business information of a business entity, and the usage fee totalizing part totalizes the usage fees to be charged to the business entity associated with the business information in accordance with the history of providing the support information including the business information.

14. The driving support system in claim 10, wherein, when the vehicle which received provision of the support information including the business information moves to a location associated with the business information or a product associated with the business information is purchased or a service associated therewith is used, the usage fee totalizing part charges the usage fees to the business entity associated with the business information.

15. The driving support system in claim 10, comprising a point giving part which gives, when the vehicle which received provision of the support information including the business information moves to the location associated with the business information or the product associated with the business information is purchased or the service associated therewith is used, a point usable for payment of the usage fees to the vehicle side.

16. The driving support system in claim 6, wherein a wireless tag which outputs unique identification information via wireless communication is laid on the magnetic marker, and the marker identification information is the identification information of the wireless tag annexed to the magnetic marker.

17. The driving support system in claim 7, wherein a wireless tag which outputs unique identification information via wireless communication is laid on the magnetic marker, and the marker identification information is the identification information of the wireless tag annexed to the magnetic marker.

18. The driving support system claim 6, wherein the upload information includes information including a lateral shift amount of the vehicle with respect to the magnetic marker, and the information providing part provides the vehicle having transmitted the upload information including the lateral shift amount with information for traveling of the vehicle along the road where the magnetic marker is arrayed as the support information.

19. The driving support system in claim 6, comprising an attribute database storing attribute information of the vehicle or a driver, and a configuration which sets an attribute information to be included in the upload information among the attribute information stored in the database, wherein the information providing part selects information to be included in the support information in accordance with the attribute information included in the upload information.

20. The driving support system in claim 10, comprising:

a provision destination management area for managing a provision destination list of the business information for each business entity by recording the identification information of the vehicle, a configuration which estimates a parking position of the vehicle when the upload information indicating that the vehicle has been parked is received from the vehicle side, a configuration which searches the business entity located in a predetermined range with reference to the parking position of the vehicle, and a configuration which determines whether or not the identification information of the vehicle as the transmission source of the upload information is in the provision destination list of the business entity searched by the configuration, wherein the identification information of the vehicle recorded in the provision destination management area is deleted with a lapse of a predetermined time, and the usage fee totalizing part charges the usage fee to the business entity associated with the provision destination list when it is determined that the identification information of the vehicle as the transmission source is in the provision destination list.

* * * * *